United States Patent [19]

Lucia et al.

[11] Patent Number: 5,582,419
[45] Date of Patent: Dec. 10, 1996

[54] FOLDING PORTABLE GOLF CART

[75] Inventors: Robert E. Lucia; S. Riley Schlueter, both of Henderson, Nev.

[73] Assignee: Nevada Bob's Pro Shop, Inc., Las Vegas, Nev.

[21] Appl. No.: 216,873

[22] Filed: Mar. 22, 1994

[51] Int. Cl.$^6$ .................................................. B62B 3/02
[52] U.S. Cl. ...................... 280/42; 280/646; 280/DIG. 6; 280/655
[58] Field of Search ............................. 280/646, DIG. 6, 280/655, 40, 47.26, 62, 47.38, 42

[56] References Cited

U.S. PATENT DOCUMENTS

| | | |
|---|---|---|
| Re. 33,939 | 5/1992 | Cheng . |
| D. 144,069 | 3/1946 | Quiring . |
| D. 166,308 | 4/1952 | Grant . |
| 2,210,632 | 8/1940 | Perrill . |
| 2,368,752 | 2/1945 | Duis . |
| 2,482,018 | 9/1949 | McDonald . |
| 2,782,048 | 2/1957 | Williams et al. ........................ 280/42 |
| 2,782,971 | 2/1957 | Hershey . |
| 2,784,005 | 3/1957 | Abgarian . |
| 2,791,436 | 5/1957 | Wuerthner . |
| 2,822,143 | 2/1958 | Johansen ........................... 280/DIG. 6 |
| 2,855,208 | 10/1958 | Abgarian . |
| 2,902,287 | 9/1959 | Elias . |
| 3,014,760 | 12/1961 | Gard . |
| 3,096,992 | 7/1963 | Fritsch ............................... 280/DIG. 6 |
| 3,128,021 | 4/1964 | Habbena . |
| 3,162,461 | 12/1964 | Krell ...................................... 280/655 |
| 3,189,364 | 6/1965 | Westphal ........................... 280/DIG. 6 |
| 3,304,036 | 2/1967 | Davis ................................. 280/DIG. 6 |
| 3,550,999 | 12/1970 | Bogan . |
| 3,698,738 | 10/1972 | Bossert . |
| 4,289,324 | 9/1981 | Nemeth ....................................... 280/42 |
| 4,657,100 | 4/1987 | Lewis ......................................... 280/655 |
| 4,705,293 | 11/1987 | Hart ........................................... 280/641 |
| 4,749,228 | 6/1988 | Potter .................................. 280/DIG. 6 |
| 4,762,193 | 8/1988 | Levine ................................. 280/DIG. 6 |
| 4,784,401 | 11/1988 | Raguet .............................. 280/DIG. 6 |
| 4,793,622 | 12/1988 | Sydlow ....................................... 280/42 |
| 4,836,573 | 6/1989 | Gebhard ................................ 280/47.38 |
| 4,913,460 | 4/1990 | Klein ........................................ 280/646 |
| 5,180,184 | 1/1993 | Chiu ......................................... 280/646 |
| 5,184,911 | 2/1993 | Wu . |
| 5,288,099 | 2/1994 | Wu ........................................... 280/646 |

*Primary Examiner*—Eric D. Culbreth
*Assistant Examiner*—Min S. Yu

[57] ABSTRACT

A folding, portable golf cart that includes a folding frame assembly, a steering arm operatively connected to the frame assembly which can be rotated open to create a fully functioning golf cart, and a simple system of supports and linkages that connects and strengthens the main frame assembly and allows the folding, portable golf cart to be folded into a compact and portable condition. The folding, portable golf cart further includes a pair of removable side wheels and a front wheel that is fixed to the forward portion of the frame assembly, enabling the folding, portable golf cart to easily be pushed by a user while transporting a golf bag, golf clubs and associated equipment from location to location. The folding, portable golf cart includes a seat assembly for supporting the user when the cart is in the folded open position but is not being moved.

18 Claims, 3 Drawing Sheets

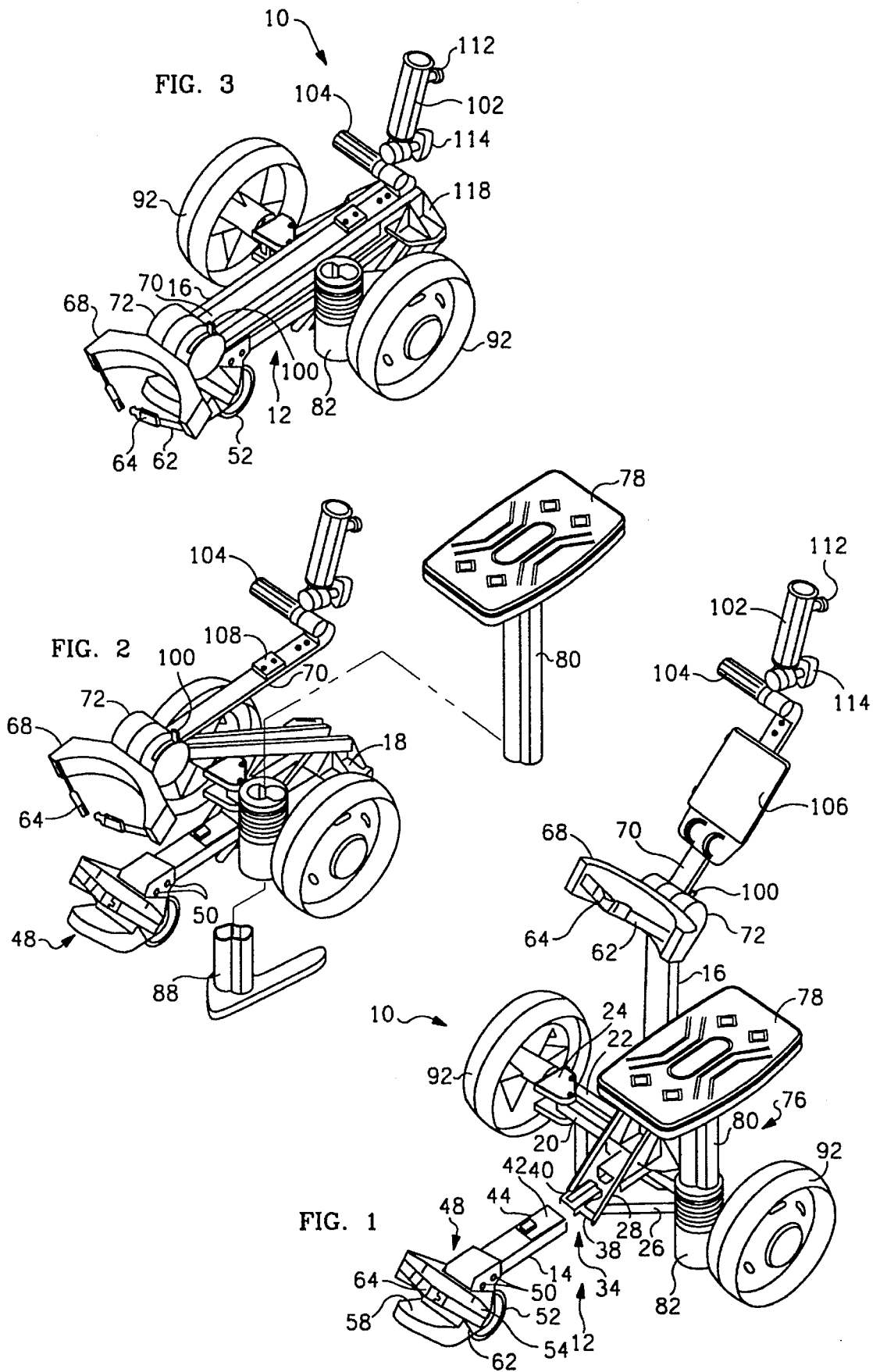

FOLDING PORTABLE GOLF CART

BACKGROUND OF THE INVENTION

1. Field of the Invention

The present invention relates to portable carts and more specifically to a folding, portable golf cart for use in carrying a golf bag with golf clubs and accessories.

2. Description of the Related Art

The sport of golf is becoming increasingly popular, resulting in a greater demand for golf carts. Portable golf carts for transporting a golf bag with clubs and accessories from location to location during a round of golf are well known and come in various types and with various accessories. Older portable golf carts were frequently heavy and cumbersome. More recently, the portability of portable golf carts has improved. Also, golf carts are now available that are collapsible or separable by a variety of methods to improve portability.

One typical class of a portable golf cart utilizes a frame assembly comprising an upper frame and a lower frame connected at a pinned or otherwise hinged joint. The lower frame supports a number of golf bag cradles and golf bag attachment means. The upper frame supports a removable or telescoping handle assembly. The handle assembly is typically adjusted through action on a pair of restraining brackets mounted on the upper frame. An axle and wheel assembly is attached to the lower frame through one of a wide variety of attachment means, providing a pair of side wheels. The frame assembly may straighten out to support the golf bag and collapse on top of itself, or it may telescope inside of itself for portability.

Portable golf cans having this basic configuration are generally subject to one or more of the following disadvantages:

a. A collapsing frame arrangement or hinge assembly that includes numerous steps or is difficult to assemble or operate;

b. An axle and wheel assembly that does not provide for rolling support at the front of the golf cart;

c. A complex and difficult to use apparatus for attaching, separating, or collapsing the axle and wheel assembly from the golf cart frame assembly;

d. Poor structural design resulting in a golf cart prone to frame damage due to a seat assembly that is directly attached to the frame;

e. Poor functional design, yielding a golf cart that does not provide all the needed supports and functions that are desirable on a modern golf course; and f. Inferior design and construction, resulting in a golf cart that is not sturdy when used.

Thus, it would be desirable to provide a portable golf cart which can be folded into a compact and light weight assembly which can easily be carried by a user or transported within a car.

It would also be desirable to provide a portable golf cart with a means of providing improved rolling support at the front end of the frame assembly.

It would be further desirable to provide a portable golf cart that provides means for seating without directly loading the frame assembly.

Also, it would be desirable to provide a portable golf cart with improved design that is lightweight, easy to operate and structurally rigid, yet very portable and inexpensive to manufacture.

SUMMARY OF THE INVENTION

The present invention concerns an improved portable golf cart. This improved portable golf cart includes a frame assembly, a steering arm that is operatively connected to the frame assembly which can be rotated open to create a fully functioning golf cart, and a simple system of supports and linkages that connects and strengthens the frame assembly and allows the folding, portable golf cart to be folded into a compact and portable condition. The folding, portable golf cart further includes a pair of removable side wheels and a front wheel that is fixed to the forward portion of the frame assembly, enabling the folding, portable golf cart to easily be pushed by a user while transporting a golf bag, golf clubs and associated equipment from location to location. The folding, portable golf cart includes a seat assembly as a means to support a user when the cart is in the folded open position but is not being moved.

As a result, the golf cart of the present invention is lightweight, easy to operate, structurally rigid and inexpensive to manufacture.

BRIEF DESCRIPTION OF THE DRAWINGS

The various advantages of the present invention will become apparent to one skilled in the art by reading the following specification and by reference to the following drawings in which:

FIG. 1 is a perspective view of the folding, portable golf cart according to the present invention shown in the fully open position.

FIG. 2 is a perspective view of the folding, portable golf cart of the present invention shown in a semi folded position with the seat and seat ground rest separated from the frame assembly.

FIG. 3 is a perspective view of the folding, portable golf cart of the present invention shown in the fully folded and closed position and with the seat assembly removed and not shown.

DETAILED DESCRIPTION OF THE PREFERRED EMBODIMENT

Figure 4:
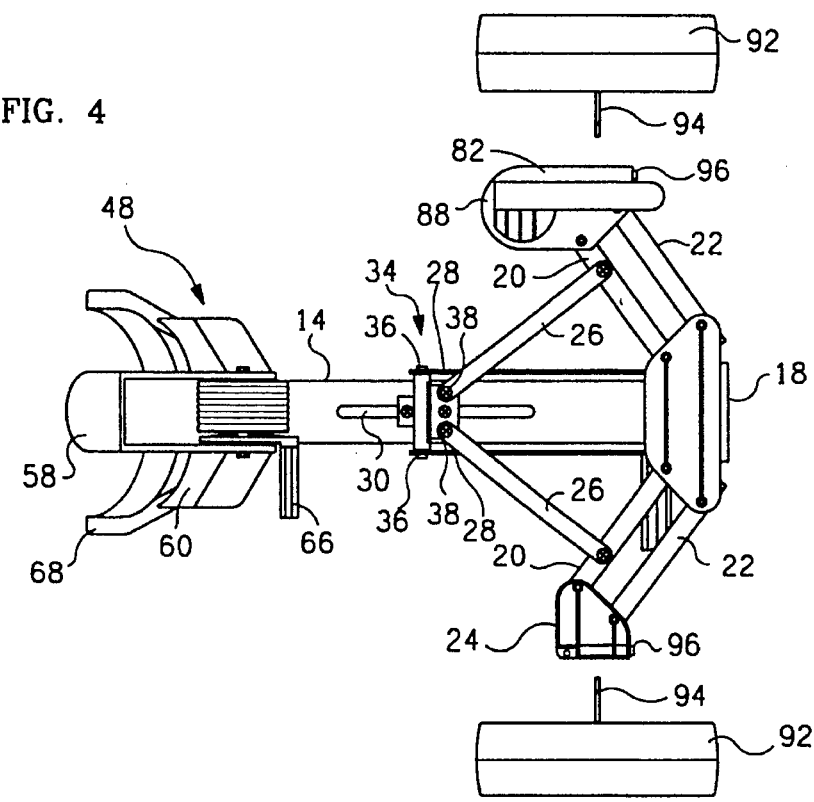
FIG. 4 is a bottom view of the folding, portable golf cart of the present invention in a semi folded position showing the wheels separated from the frame assembly and the seat removed.

Referring to the drawings and more particularly to FIGS. 1, 3 and 4, a preferred embodiment of the folding, portable golf cart embodying the present invention will be described.

A folding, portable golf cart 10 has a frame assembly 12 that comprises a lower frame 14 foldably connected to an upper frame 16 through a central joint 18. The central joint 18 is also foldably connected to a pair of inside parallel axles 20 and outside parallel axles 22 on either side and perpendicular to the axis of the frame assembly 12. An axle bracket 24 is connected to the opposite sides of each pair of inside parallel axles 20 and outside parallel axles 22. The axle brackets 24 act to support the wheel axles 94 and thus, the wheels 92.

Figure 5:
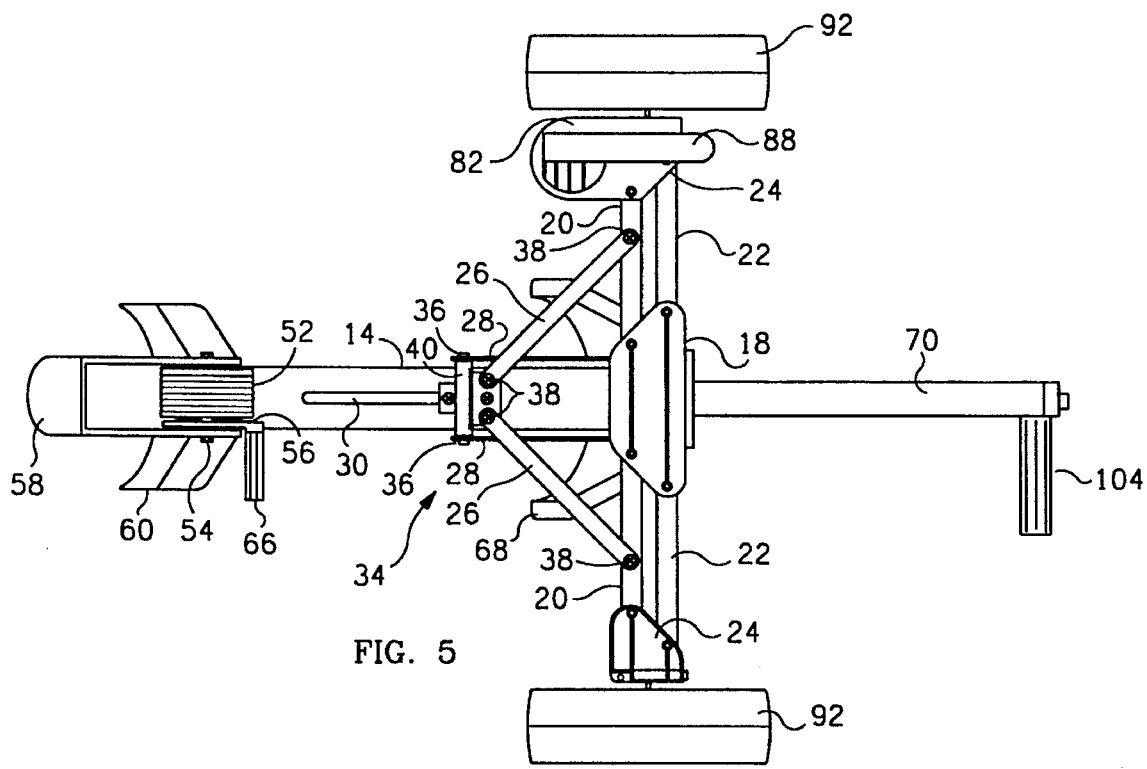
FIG. 5 is a bottom view of the folding, portable golf cart of the present invention shown in the fully open position.

Referring now to FIGS. 1, 4 and 5, in addition to FIG. 1, a pair of vertical parallel linkage arms 28 are connected between vertical linkage fasteners 36 mounted on each side of the upper frame 16 and vertical linkage fasteners 36 mounted on a sliding linkage assembly 34. A pair of horizontal parallel linkage arms 26 are connected between horizontal linkage fasteners 38 mounted on each inside parallel axle 20 and the horizontal linkage fasteners 38 mounted on the sliding linkage assembly 34. In addition to the two pairs of linkage fasteners 36 and 38, the sliding linkage assembly 34 comprises an internal slide block 40 that fits inside and is limited to move within the hollow tubular shape of the lower frame 14. A groove 30 within the base of the lower frame 14 and along the sliding linkage assembly's 34 path of travel, allows the internal slide block 40 and the linkage fasteners 36 and 38 of the sliding linkage assembly 34 to be a one piece member 34.

Referring now to FIGS. 1, 2 and 4, operation of the folding mechanism of the folding portable golf cart 10 will be described. The vertical parallel linkage arms 28 connected between the upper frame 16 and the sliding linkage assembly 34 act to force the lower frame 14 to move with the upper frame 16. The horizontal parallel linkage arms 26 connected between the inside parallel axles 20 and the sliding linkage assembly 34 force the axle brackets 24 and the installed wheels 92 to move with the folding frame assembly 12. Thus, unfolding of the frame assembly 12 acts to move the wheels 92 from a position adjacent to the folded frame assembly 12 to a position perpendicular to the frame assembly 12. The vertical parallel linkage arms 28 further act to sturdy the frame assembly 12 and the horizontal parallel linkage arms 26 further act to restrain the inside parallel axles 20 and thus the wheels 92 in the open position. A spring stop lock 42 mounted on the lower frame 14 automatically locks the sliding linkage assembly 34 and thus the frame assembly 12 when it is moved into the fully open position. The sliding linkage assembly 34 is released from it's locked position by pressing on the release button 44, which releases the sliding linkage assembly 34 and allows the frame assembly 12 to be folded. The axle bracket 24 is designed to keep the wheels 92 parallel to the frame assembly 12 regardless of the folded position.

Figure 6:
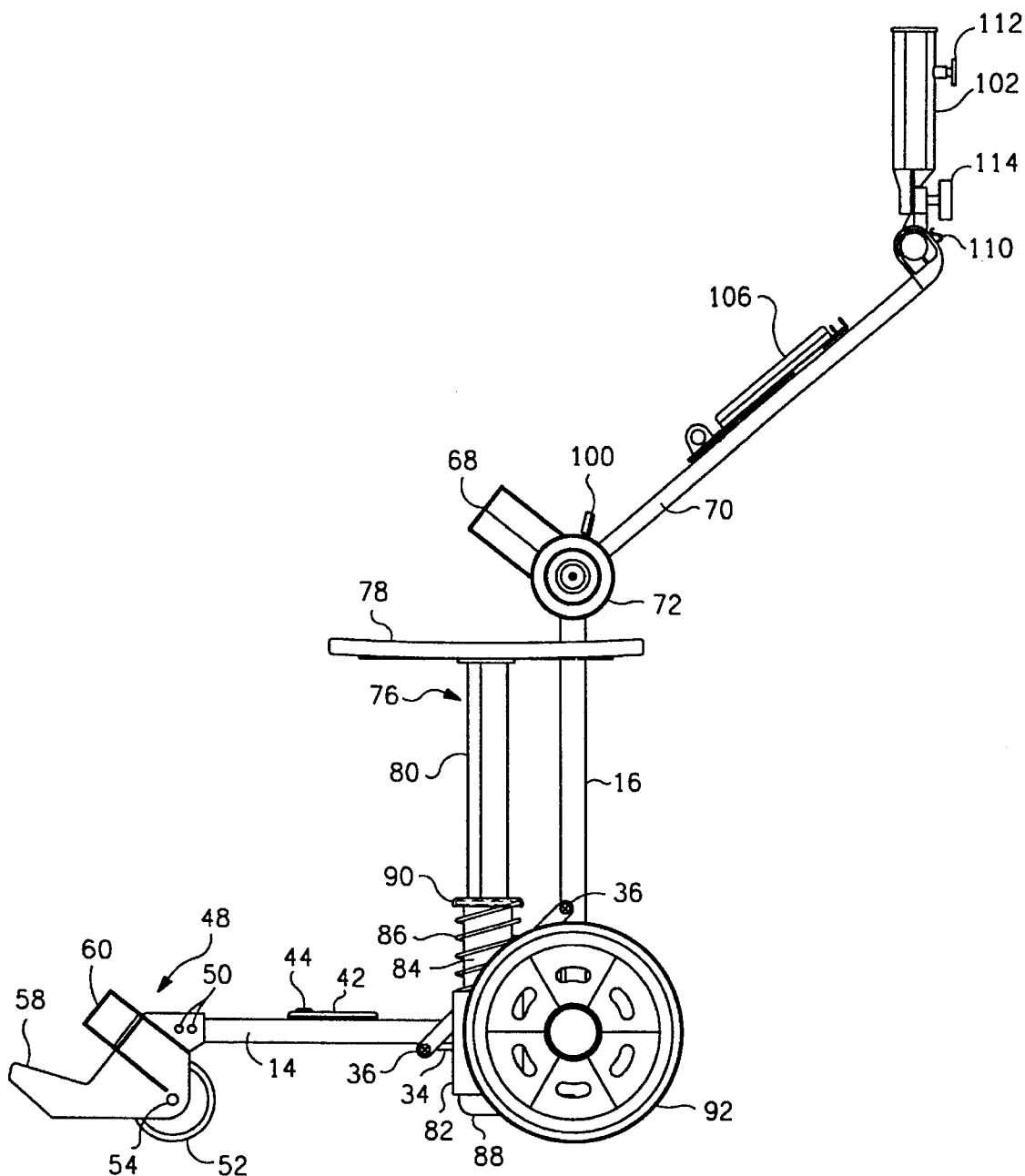
FIG. 6 is a side view of the folding, portable golf cart of the present invention showing the seat assembly and seat supporting means.

Referring to FIGS. 1, 5 and 6, a forward wheel assembly 48 is mounted to the front end of the lower frame 14 using a plurality of fasteners 50. Wheel assembly 48 includes a front wheel 52, a front axle 54 and a front wheel brake 56. The forward wheel assembly 48 is formed to provide a base support 58 for a golf bag (not shown) and also a lower bag cradle 60. The lower bag cradle 60 supports a restraining strap 62 and restraining buckle 64. The front wheel brake 56 is a friction type lock that is actuated when pressed down by a user and released when pulled up. The location of the brake actuator 66 is convenient for foot actuation.

Referring to FIGS. 2 and 3, a steering arm 70 is pivotally connected to the upper frame 16 through a springed pivot joint 72. The steering arm 70 is shaped and sized so that when it is rotated to its closed position, it fits inside the upper frame arm 16. The springed pivot joint 72 automatically locks the steering arm 70 in the closed and open positions. Actuation of the push tab 100 mounted on the springed pivot joint 72 acts to release the steering arm 70. The springed pivot joint 72 also supports the upper bag cradle 68, a restraining strap 62 and a restraining buckle 64.

Referring to FIGS. 6, a seat assembly 76 for a user is operatively connected to the lower frame 14 and will be generally described. The seat 78 is attached to a shaped support tube 80 using springed pin fasteners (not shown). The shaped support tube 80 fits inside and is supported by a shaped tube receiver 84. The shaped tube receiver 84 fits inside and is supported by a spring 86 which acts on the flange 90 of the shaped tube receiver 84. Thus, the spring 86 acts to support the shaped tube receiver 84, the shaped support tube 80 and the seat 78. The base of the spring 86 is supported by a seat support housing 82 which is rigidly connected to an axle bracket 24. The seat support housing 82 is hollow and allows free movement of the shaped tube receiver 84. The spring constant is such that the spring 86 remains extended and forces the seat 78 to it's maximum up position when unloaded but the spring 86 is fully compressed and the seat ground rest 88 contacts the ground when the seat 78 is moderately loaded. The seat ground rest 88 is attached to the base of the shaped tube receiver 84 with springed pin fasteners (not shown). The seat ground rest 88 limits the height the spring 86 can lift the seat 78 which also retains the spring 86 in a preloaded condition. This preloading of the spring 86 also acts to keep the seat assembly 76 in a fixed and generally rigid condition while the folding, portable golf cart 10 is being used.

For portability, or if its use is not desired, the seat assembly 76 can be removed from the folding, portable golf cart 10 by sliding the shaped support tube 80 out from the shaped tube receiver 84. The seat assembly 76 is reinstalled by simply inserting the shaped support tube 80 into the shaped tube receiver 84. The seat assembly 76 can be further disassembled by detaching the ground rest 88 from the shaped tube receiver 84 at the springed pin fasteners (not shown). The shaped tube receiver 84, spring 86, and ground rest 88 can then be removed from the frame assembly 12. The seat 78 can also be removed from the shaped support tube 80 by action on springed pin fasteners (not shown) to increase portability.

A user can quickly convert the folding, portable golf cart 10 from its disassembled and fully collapsed position as shown in FIG. 3 into its fully open and useable configuration as shown in FIG. 1. The user would first place the folding, portable golf cart 10 on the ground. Referring to FIG. 4, if the wheels 92 were removed from the folding, portable golf cart 10, they would be reconnected by pushing the axle release button 96 and inserting the wheel axles 94 into the axle brackets 24. The axle release button 96 is spring actuated and automatically locks each wheel axle 94 into the axle bracket 24. Now, referring to FIG. 2, the seat assembly 76 would be installed into the frame assembly 12 as previously described unless it's use was not desired.

Referring to FIGS. 1, 2, 3 and 6, the upper frame 16 would be unfolded from its position parallel to the lower frame 14, to an upright position perpendicular to the lower frame 14. Movement of the upper frame 16 in relation to the lower frame 14 forces the axle brackets 24 and wheels 92 to move to their fully open positions perpendicular to the frame assembly 12. The user can now rotate the steering arm 70 from its position inset to the upper frame 16 to its open position by actuating the spring actuated push tab 100 mounted on the springed pivot joint 72. The steering arm 70 is automatically locked into it open position by the springed pivot joint 72. The user can now rotate the umbrella holder 102 into its desired position by loosening the threaded handle 104, repositioning the umbrella holder 102 and retightening the threaded handle 104. The desired position of the umbrella holder 102 can be further adjusted through action on the threaded umbrella positioning knob 114. A lock knob bolt 112 is used to hold the umbrella (not shown) in the umbrella holder 102.

A scorecard holder 106 can be attached to the steering arm 70 at the mounting bracket 108. A bag (not shown) for holding golf balls or other accessories can be hung from the clip 110 located on the end of the steering arm 70. A golf bag (not shown) can now be loaded onto the lower bag cradle 60 and base support 58 and against the upper bag cradle 68. Restraining straps 62 and restraining buckles 64 are used to secure the golf bag (not shown) to the folding, portable golf cart 10. The user is now ready to use the folding, portable golf cart 10 of the present invention.

After the user has finished using the folding, portable golf cart 10 of the present invention, it can be collapsed and disassembled in a similar fashion. Prior to folding of the frame assembly 12, the user must first release the sliding linkage assembly 34 by pressing the release button 44. Folding of the frame assembly 12 can then be accomplished by reversing the previously described assembly procedure.

While the preferred embodiments of the invention have been described above, it will be recognized and understood that various changes and modifications may be made therein and that the appended claims are intended to cover all such modifications which may fall within the spirit and scope of this invention.

What is claimed is:

1. A folding, portable golf cart assembly comprising:

upper frame member;

horizontal lower frame member foldably connected to said upper frame member;

a pair of parallel axles connected to said lower frame member;

connection means for foldably connecting said upper frame member with said lower frame member and for foldably connecting said parallel axles with said lower frame member wherein during folding said parallel axles move forward in a path which is coplanar with the lower frame member;

a pair of axle brackets rotatably connected to each of the pairs of said parallel axles;

a pair of side wheels connected to the said axle brackets;

a steering arm;

pivot connector rotatably connecting said upper frame member to said steering arm;

linkage means connected to said connection means for controlling and directing the folding of the folding, portable golf cart;

handle means operatively connected to the upper end of said steering arm;

forward wheel assembly attached to the front of said lower frame member; and means attached to said lower frame member for securing a golf bag to said folding, portable golf cart.

2. The folding, portable gold cart of claim 1, wherein said connection means comprises:

hinged joint with a horizontal axis for connecting said lower frame member to said upper frame member; and a pair of hinged joints with vertical axis located on each side of said lower frame member.

3. The folding, portable golf cart of claim 1, wherein said forward wheel assembly comprises:

forward wheel axle assembly connected to said lower frame member that provides rolling support to said folding, portable golf cart;

said forward wheel and axle assembly including:

wheel cover means for shielding the top and sides of said wheel and for supporting said forward wheel axle;

brake means for stopping and locking said front wheel;

brake actuator that is directly linked to said brake;

base support, connected to the lower frame member, for supporting the base of a golf bag; and cradle means for securing said golf bag.

4. The folding, portable golf cart as described in claim 3, wherein said pivot connector further comprises:

locking means for locking said steering arm in the folded and unfolded positions; and second cradle means for securing said golf bag.

5. The folding, portable golf cart as described in claim 4, wherein both said means for securing a golf bag each comprise golf bag restraining straps and buckles for restraining a golf bag.

6. The folding portable golf cart as described in claim 1, wherein said handle means further comprises a means for supporting and directing an umbrella.

7. The folding, portable golf cart as described in claim 1, wherein said folding, portable golf cart further comprises a removable seating means operatively connected to said axle bracket, said removable seating means being supported by the ground when loaded.

8. A folding, portable golf cart assembly comprising:

upper frame member;

horizontal lower frame member foldably connected to said upper frame member;

a pair of parallel axles connected to said lower frame member;

connection means for foldably connecting said upper frame member with said lower frame member and further connecting said parallel axles with said lower frame member;

a pair of axle brackets rotatably connected to each of the pairs of said parallel axles;

a pair of side wheels connected to said axle brackets;

a steering arm;

pivot connector rotatably connecting said upper frame member to said steering arm;

linkage means connected to said connection means for controlling and directing the folding of the folding, portable golf cart;

handle means operatively connected to the upper end of said steering arm;

forward wheel assembly attached to the front of said lower frame member; and means attached to said lower frame member for securing a golf bag to said folding, portable golf cart, wherein said connection means comprises:

hinged joint with a horizontal axis for connecting said lower frame member to said upper frame member; and pair of hinged joints with vertical axis located on each side of said lower frame member, and wherein said linkage means comprises:

sliding linkage assembly;

a pair of vertical linkage arms connected between said upper frame member and said sliding linkage assembly;

a pair of horizontal linkage arms connected between each pair of said parallel axles and said sliding linkage assembly;

said sliding linkage assembly being connected to one end of each of said vertical linkage arms and also to one end of each said horizontal linkage arms, said sliding linkage assembly also being restrained to slide along the lower frame member; and locking and release means attached to said lower frame member for automatically locking the sliding linkage assembly when said lower frame member is perpendicular to said upper frame member.

9. The folding, portable golf cart as described in claim 8, wherein said steering arm further comprises an attachment means for attaching various golfing accessories.

10. A folding, portable golf cart assembly comprising:

upper frame member;

lower frame member including a top side and being foldably connected to said upper frame member;

a pair of parallel axles connected to said lower frame member;

connection means for foldably connecting said upper frame member with said lower frame member and further connecting said parallel axles with said lower frame member;

a pair of axle brackets rotatably connected to each of the pairs of said parallel axles;

a pair of side wheels connected to the said axle brackets;

a steering arm;

pivot connector rotatably connecting said upper frame member to said steering arm;

linkage means connected to said connection means for controlling and directing the folding of the folding, portable golf cart so that said connection means simultaneously folds the upper frame member with respect to the lower frame member, and also the parallel axles with respect to the lower frame member;

handle means operatively connected to the upper end of said steering arm;

forward wheel assembly attached to the front of said lower frame member;

means attached to said lower frame member for securing a golf bag to said folding, portable golf cart; and removable seating means operatively connected to said axle bracket wherein the upper frame member folds forward onto the top side of said lower frame member and wherein the parallel axles fold inwardly adjacent to the lower frame member.

11. The folding, portable golf cart of claim 10, wherein said removable seating means comprises means for supporting said seating means by the ground when loaded.

12. The folding, portable golf cart of claim 10, wherein said connection means comprises:

hinged joint with a horizontal axis for connecting said lower frame member to said upper frame member; and a pair of hinged joints with vertical axis located on each side of said lower frame member.

13. The folding, portable golf cart of claim 10, wherein said forward wheel assembly comprises:

forward wheel and axle assembly connected to said lower frame member that provides rolling support to said folding, portable golf cart;

said forward wheel and axle assembly including:
wheel cover means for shielding the top and sides of said wheel and for supporting said forward wheel axles;
brake means for stopping and locking said front wheel;
brake actuator that is directly linked to said brake;
base support, connected to the lower frame member, for supporting the base of a golf bag; and cradle means for securing said golf bag.

14. The folding, portable golf cart as described in claim 13, wherein said pivot connector further comprises:

locking means for locking said steering arm in the folded and unfolded positions, and second cradle means for securing said golf bag.

15. The folding, portable golf cart as described in claim 14, wherein both said means for securing a golf bag each comprise a golf bag restraining straps and buckles for restraining a golf bag.

16. The folding, portable gold cart as described in claim 10, wherein said handle means further comprises a means for supporting and directing an umbrella.

17. A folding, portable golf cart assembly comprising:

upper frame member;

lower frame member foldably connected to said upper frame member;

a pair of parallel axles connected to said lower frame member;

connecting means for foldably connecting said upper frame member with said lower frame member and further connecting said parallel axles with said lower frame member;

a pair of axle brackets rotatably connected to each of the pairs of said parallel axles;

a pair of side wheels connected to the said axle brackets;

a steering arm;

pivot connector rotatably connecting said upper frame member to said steering arm;

linkage means connected to said connection means for controlling and directing the folding, of the folding, portable golf cart;

handle means operatively connected to the upper end of said steering arm;

forward wheel assembly attached to the front of said lower frame member; and means attached to said lower frame member for securing a golf bag to said folding, portable golf cart; and removable seating means operatively connected to said axle bracket, wherein said removable seating means comprises means for supporting said seating means by the ground when loaded, and wherein said connection means comprises:
hinged joint with a horizontal axis for connecting said lower frame member to said upper frame member; and
a pair of hinged joints with vertical axis located on each side of said lower frame member, and
wherein said linkage means comprises:

sliding linkage assembly;

a pair of vertical linkage arms connected between said upper frame member and said sliding link assembly;

a pair of horizontal linkage arms connected between each pair of said parallel axles and said sliding linkage assembly;

said sliding linkage assembly being connected to one end of each of said vertical linkage arms and also to one end of each said horizontal linkage arms, said sliding linkage assembly also being restrained to slide along the lower frame member; and locking and release means attached to said lower frame member for automatically locking the sliding linkage assembly when said lower frame member is perpendicular to said upper frame member.

18. A folding portable golf cart assembly comprising:

upper frame member;

lower frame member foldably connected to said upper frame member;

a pair of parallel axles connected to said lower frame member;

connection means for foldably connecting said upper frame member with said lower frame member and further connecting said parallel axles with said lower frame member;

said connection means further including a hinged joint with a horizontal axis for connecting said lower frame member to said upper frame member, and a pair of hinged joints with vertical axis located on each side of said lower frame member;

a pair of axle brackets rotatably connected to each of the pairs of said parallel axles;

a pair of side wheels connected to the said axle brackets;

a steering arm;

pivot connector rotatably connecting said upper frame member to said steering arm;

linkage means connected to said connection means for controlling and directing the folding of the folding, portable golf cart;

said linkage means including a sliding linkage assembly, and a pair of vertical linkage arms connected between said upper frame member and said sliding linkage assembly;

a pair of horizontal linkage arms connected between each pair of said parallel axles and said sliding linkage assembly;

said sliding linkage assembly being connected to one end of each of said vertical linkage arms and also to one end of each said horizontal linkage arms, said sliding linkage assembly also being restrained to slide along the axis of said hollow lower frame member; and locking and release means attached to said lower frame member for automatically locking the sliding linkage assembly when said lower frame member is perpendicular to said upper frame member.

* * * * *